W. H. MASON.
APPARATUS FOR TRANSFERRING AND CLASSIFYING FREIGHT.
APPLICATION FILED OCT. 15, 1918. RENEWED SEPT. 16, 1922.
1,437,536.
Patented Dec. 5, 1922.
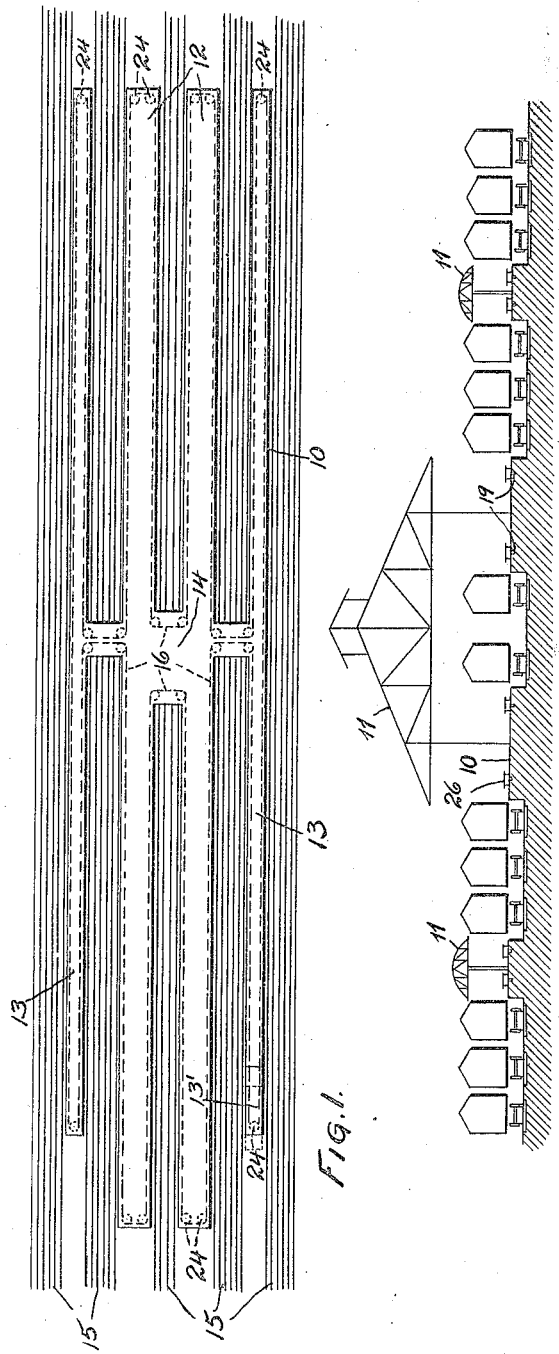
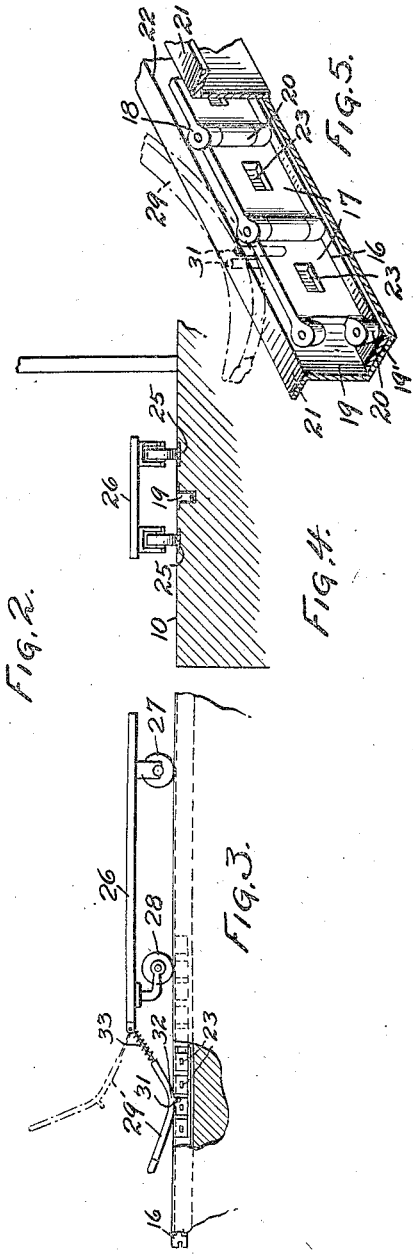
Inventor:
William H. Mason
by H. H. Dyke
Attorney Patented Dec. 5, 1922.

1,437,536

UNITED STATES PATENT OFFICE.

WILLIAM H. MASON, OF HAVERFORD, PENNSYLVANIA.

APPARATUS FOR TRANSFERRING AND CLASSIFYING FREIGHT.

Application filed October 15, 1918, Serial No. 258,259. Renewed September 16, 1922. Serial No. 538,729.

*To all whom it may concern:*

Be it known that I, WILLIAM H. MASON, a citizen of the United States, and a resident at Haverford, county of Montgomery, and State of Pennsylvania, have invented certain new and useful Improvements in Apparatus for Transferring and Classifying Freight, of which the following is a specification.

My invention relates to the handling of articles, such as pieces of freight, at transfer stations, and has for its object the provision of improved apparatus for and methods of transferring and classifying freight and the like.

In freight transfer stations there are two principal operations to be performed. Freight from cars loaded or partially loaded with miscellaneous shipments (known as less than carload or L. C. L. freight) must be taken out and distributed into other cars which can be fully loaded and sealed for carload shipment to distant points, and second, a certain proportion of cars must be loaded "train order," or, in other words, so that the freight destined for the first or nearest station is last loaded and may be first taken out, etc., that for the terminal station to which the car is routed, and which is last to be removed, going into the car first.

At a large transfer station where hundreds of cars are brought in and their contents moved to other cars each day, an enormously involved and complicated problem of transfer, classification and distribution is presented, the number of separate operations or transfers being roughly to be figured by multiplying the number of cars from which freight is taken by the average number of cars to which deliveries or transfers therefrom are made, as, for example, if 200 cars come in for transfer and the contents of an average car are distributed to twenty of the cars being loaded, 200 times 20 or 4000 separate transfer operations are required to be made in distributing L. C. L. freight from the two hundred cars to perhaps 165 cars loaded, in carload lots, train order or otherwise, the length of the trips involved in the making of the many transfers varying according to the distance between the cars from which the freight is taken and those into which it is to be loaded, as the cars happen to be placed in the station. This difficult work is carried on with varying degrees of efficiency in various transfer stations, but, so far as I am aware, the best practice now in use consists in the provision of platforms at car floor level, over which the freight to be transferred is moved, either on ordinary hand trucks or on four wheeled trucks, which latter are sometimes connected together in trailer trains of several trucks and hauled about on the platform by means of small tractors.

Both these methods of procedure have numerous features of disadvantage. The hand trucking is heavy labor, strong men are required to do it, and much time is lost coming back over considerable distances, sometimes amounting to several hundred yards, with the empty truck for another load. The tractors cannot turn on a narrow platform with a string of trucks trailing behind, the string of trailer trucks must be made up with care so that trucks can be detached from the rear substantially consecutively, since to remove a truck at an intermediate point would break up the train, and various other difficulties are presented with the use of tractors, which, however, are effective to the extent that they at least partially do away with hand trucking and permit the employment of women and of older men and boys who are unequal to doing the heavy labor of hand trucking.

The present invention is designed for the elimination of difficulties such as the foregoing in the transferring of freight, and for the substitution of power for much hand labor, thereby making the transfer of freight comparatively light and easy and not requiring strong and powerful laborers for its performance, and furthermore, the various pieces of freight are taken from any desired point and delivered, in accordance with my invention, substantially automatically where they are wanted without special routing or attention.

These and related objects are attained in accordance with the present invention by the provision of an endless flexible traveler or hauling means, such as an endless chain, cable or the like, traveling about the platforms of the transfer station and alongside the cars set on the tracks. Trucks which may be similar to the four wheeled trucks heretofore in use, and which may be readily drawn by hand into a car and loaded therein and then drawn out of the car, are provided and are adapted to be detachably connected to the endless traveler at all points along the length thereof, and when so attached, such trucks move along automatically in a closed path adjacent to all the cars and may be detached (or light articles taken therefrom without detaching the truck) when they arrive at or near the car into which the freight placed therein is to be delivered. Placards may be provided to indicate destination, as, for example, different colors may be assigned to different platforms, and a card having such color may be attached to all trucks to be stopped there, with, preferably, a number or the like to indicate a station or particular location on such platform. In some cases the distance to be traveled may be shortened by detaching the truck from the carrier at one point and attaching it at another, thus short circuiting a portion of the normal path of travel, and a traveler is so arranged that this may be done. Empty trucks, when not wanted, are simply attached to the traveler and move along until they come to a point where they are wanted, when they are detached and put into use. Tracks are preferably provided for the trucks and may be flat iron plates set in the platform floor. The carrier is preferably run in a narrow slot so as to be out of the way and not to interfere with pulling the trucks across the platform, and the carrier is preferably moved comparatively slowly at a speed of, say, about 200 to 300 feet per minute, which speed can readily be exceeded by a person walking, and at which speed trucks can be readily attached and detached, and a person drawing a truck behind him may readily cross the platform between trucks attached to the traveler and moving therewith.

In the accompanying drawings I have shown, somewhat diagrammatically, apparatus, by which the invention may be carried out. In said drawings, Figure 1 is a diagrammatic plan view of a transfer platform and railroad tracks, Figure 2 is a diagrammatic transverse cross-sectional view thereof, Figure 3 is a side view of a truck attached to an endless chain traveler, Figure 4 is a transverse view of parts shown in Figure 3, and Figure 5 is a detail perspective view with parts broken away and showing one mode of detachably connecting trucks to and endless chain.

Reference character 10 is applied to designate the transfer platform generally. It may be of various forms and is placed at car floor level and usually has a roof 11 which may also cover the car tracks or portions thereof.

The platform 10 has a number of parallel portions including wider inner portions 12, 12 and narrower side portions 13, 13 and a cross connecting portion 14, but the form and structure of the platform varies with the conditions in different yards, as will be understood. It should be so constructed, however, that access may be had from any part of the platform to all other parts thereof.

The railroad tracks are indicated by reference character 15. There may be several tracks between platforms, as two, three or more, but usually not over three tracks are placed between platforms, since access to cars on the intermediate track or tracks can only be had by passing through the cars adjacent to the platform.

The endless traveler illustrated has the form of a chain 16 made up of links 17 pivoted together for horizontal turning movement, as by vertical pins 18. The chain 16 runs in a channel 19 which is narrow, being only wide enough to permit the enlarged heads 20 of the links 17 to pass with proper working clearance. The channel 19 may have side flanges 21 by which it may be conveniently secured to the platform on each side of the slot or opening formed therein for its reception, and is open at the top between the side flanges 21, as shown at 22. Wear plates 19' may be placed along the bottom of the slot or channel 19 if desired.

The links 17 are provided with means for taking the drive, as, for example, they may be provided with sprocket holes 23.

The endless traveler, in the form shown the chain 16, runs continuously entirely around the platform, or such portions thereof as freight is to be taken from or delivered to, and it is so indicated in dotted lines in Figure 1, passing over horizontally arranged wheels 24 at the turns. These wheels 24 may have means for application of power to drive the traveler, or power may be otherwise applied. Preferably power is applied at a number of driving points in the length of the traveler, which may be quite long, as, for example, in the case of a large transfer station it may have a length of two miles or more. A convenient mode of driving is by a number of synchronous electric motors, with, of course, suitable speed reduction means, which, however, is not illustrated, as any suitable driving means may be used, and, as stated, the driving power may be applied, for example, through the sprocket wheels 24.

Various provisions may be made for taking up slack resulting from wear. In Figure 1, for example, I have shown one end section 13' of a platform section 13 arranged for endwise movement relative to the main part of the platform, and by such movement the wheel 24 carried by the section 13' may be moved outwardly in order to compensate for wear and take up slack in the chain, but any suitable means may be resorted to for taking up the slack, as removal of links and the like.

While not essential in all cases, metal tracks such as plates 25 may be provided at each side of the chain 16 for the trucks to run on. They may lie flat on or within the floor surface. The slot 19 being narrow, neither the traveler in its slot nor the tracks 25, provided for preventing wear of the platform by the trucks, interfere to any substantial extent with the normal use of the platform in cross-wise or other directions.

Trucks 26 adapted for use with a traction chain are illustrated in Figures 3 and 4 and may have rear wheels 27 and swivelling front wheels 28 adapted to turn readily in any direction in which the truck is drawn. Means are provided for detachably connecting the trucks to the chain or other endless traveler. In the form shown, tongues 29 having handles 30 are pivotally attached to the trucks at the front ends thereof, and these tongues are provided with means for detachably engaging the links 17, which means, in the form shown, comprise a pair of separated fingers or lugs 31 projecting downwardly from the tongues 29, and the tongues 29 are preferably bent downwardly at about the middle thereof, as shown at 32, so that the handles 30 project upwardly and are readily grasped, the fingers 31 for engaging links 17 projecting downwardly from the lowermost portions of the tongues. These fingers or lugs 31 are placed a sufficient distance apart to pass on each side of and embrace the web of the links 17, but are not sufficiently far apart to pass over the heads 20 of the links 17, so that when placed astride of the web of a link they embrace same and slide along until they reach the head 20, by which they are stopped, and the trucks are drawn along by and with the chain. The overall width of the fingers 31 is less than the width of the slot 19, so that they pass readily along within the slot. The trucks may be provided with shock absorbing means, as springs 33, to ease the jerk which the moving chain imparts to the truck when setting it into action.

It will be seen that the trucks 26 can be loaded and immediately attached to the moving traveler, and a truck so attached will continue to move about the entire platform, finally returning to the point from which it started, but that the trucks may be detached, when they arrive at any desired location, by the gang working on a particular part of the platform at which the car to receive their contents is stationed. As already stated, indicating means may be placed on the loaded truck pointing out its destination on the platform, the car into which it is to be placed and its order in the car if to be shipped train order, etc., etc. If, however, it is desired to expedite the moving of a particular truck, a dispatcher may be stationed at a convenient place, such as the cross platform 14, about which the various branches or loops of the traveler converge until they are substantially near together, and he may detach trucks from certain parts of the traveler and attach them to others, thus cutting out portions of the path of travel and shortening the path of travel for such trucks. The platform 14 may also be conveniently used as a storage place for reserve or empty trucks, for detaining trucks containing portions of train order shipments for later loading until those for earlier loading have passed ahead, and for various other purposes, and the dispatcher can readily attach empty or loaded trucks for short travel delivery to any part of the traveler where needed, though such attention is ordinarily not required since each truck will sooner or later automatically arrive at the location where it is wanted, the complete circuit of, say, two miles being traversed in about 35 minutes when the rate of travel is, say, 300 feet per minute. If, say, 400 trucks, having each a length of six feet, are provided for use with a traveler, say, two miles in length, only somewhat under one-fourth of the available space along the length of the traveler is taken up by the trucks when they are all traveling at once, so that there is always plenty of room left for crossing the traveler and for attaching and detaching trucks therefrom, which is readily accomplished by simply lowering or lifting the tongues 29, bringing the fingers 31 into or out of engagement with the chain links or other engaging devices with which the traveler may be provided.

It will be seen that the invention presents numerous features of advantage. The work of making transfers is practically confined to loading and unloading trucks and attaching same to and detaching them from the endless chain or other traction means, and this is comparatively light labor which can be done by women or by older men or boys, freeing numbers of able bodied men heretofore required for this work whose services may more advantageously be used elsewhere. Trucks such as are already available for use with tractors can be utilized with only slight changes, consisting principally in fitting new tongues or modifying the present tongues. The slot and tracks being flat on the floor of the platform, there is no interference (save when a truck is passing) with the use of the platform in the usual way to the fullest extent; the apparatus may be installed in sections without substantially interfering with the normal use of the platform during installation; trucks may be delivered and collected from comparatively narrow platforms and substantially entirely to the end thereof; the traveler being kept continuously in motion during use, the power required is comparatively small; the invention is especially applicable to loading cars train order, since any truck with freight thereon can be detached at any point in the series and the order readily arranged or rearranged at will; the trucks may be attached to or detached from the traveler at will in all parts of its length, and any point along the traveler may be used for loading or unloading, permitting great freedom of operation and very great latitude in the placing of cars on the tracks of the transfer station, since the distance between particular cars in the transfer station is no longer a factor of such importance as heretofore, and various other advantages are obtained.

While my invention is more especially described in connection with transfer and classification of freight, it is not limited thereto but may be used in connection with collection, distribution, transfer and classification of articles of various kinds.

I claim:

1. The combination of a series of open ended platforms communicating in a common platform, an endless traveler traveling out and back on the platforms of said series and traveling on the common platform from one to another of the platforms in said series, and trucks adapted to be attached to or detached from said traveler in all parts of the length thereof.

2. Apparatus for transferring freight or the like comprising a platform having elongated substantially parallel portions and a cross-wise connecting portion, a continuously moving traveler running out and back on the parallel portions of said platform and from one to another thereof over said connecting portion, and trucks adapted to be attached to and detached from said traveler at will and in all parts of the length thereof.

3. Apparatus for transferring freight or the like comprising a continuously moving traveler having a plurality of branches running out and back to form loops converging toward one another about a common platform, and trucks adapted to be attached to and detached from the traveler, the common platform being adapted to serve as a station at which trucks may be transferred from one branch of the traveler to another.

4. Apparatus for transferring freight or the like comprising a platform having a slot therein, a link chain adapted to be run in said slot, wheeled trucks adapted to run on said platform, tongues pivoted to said trucks, and means on said tongues adapted to be engaged with and disengaged from said chain at will and in all parts of the length thereof, said tongues extending upwardly beyond said engaging means and provided with a hand hold.

5. Apparatus for transferring freight or the like comprising a narrow open topped channel arranged in substantially a horizontal plane, a chain in said channel and made up of links having enlarged heads of substantially the width of the channel and intermediate webs substantially narrower than the heads, and trucks provided with fingers spaced apart and adapted to straddle the web of the chain links and to be engaged with and advanced by the heads of said links.

6. A platform having relatively movable sections, an endless traveler, wheeled trucks adapted to be actuated by said traveler and to run on said platform, wheels about which the traveler passes on the said platform sections, the relative movability of the platform sections being adapted to provide adjustment to compensate for wear of the traveler.

7. The combination with a truck of a tongue pivoted thereto and having means on its lower side for detachably engaging a traveler, said tongue being extended upwardly beyond said engaging means.

8. The combination with a truck of a tongue bent downwardly at substantially its middle and having a hand hold at one end and secured to the truck at the other end, and a pair of separated fingers extending downward from the downwardly bent portion thereof.

In testimony that I claim the foregoing, I have hereto set my hand, this tenth day of October, 1918.

WILLIAM H. MASON.